United States Patent Office 3,240,795
Patented Mar. 15, 1966

3,240,795
ORGANOMETALLIC COMPOUNDS
Hugh E. Ramsden, Scotch Plains, N.J., assignor to Esso Research and Engineering Company, a corporation of Delaware
No Drawing. Filed July 2, 1962, Ser. No. 207,083
18 Claims. (Cl. 260—429.7)

This invention relates to novel organic compounds of tetravalent Group IV–B elements of atomic number 14 to 82 and to processes for their preparation. More particularly, the invention relates to silicon, germanium, tin and lead derivatives of 9,10-dihydroanthracenes.

Commercial interest in the organometallic derivatives of the Group IV–B elements of atomic number 14 to 82, i.e. silicon, germanium, tin and lead, stems from the wide variety of uses to which such compounds may be put. Their diversity of function is, of course, affected not only by choice of the particular Group IV–B element employed, but also by the nature, number and bonding of the other substituents to the metal atom. Hence, considerable effort has been made to develop organic derivatives of these metals which possess novel structures.

It has now been surprisingly found that novel organometallic compounds, including polymers, are formed upon reacting alkali metal adducts of anthracene with the halides of Group IV–B elements. In the course of the reaction, the alkali metal of the anthracene adduct is removed by halogen of the Group IV–B metal halide, the resulting residue of the metal halide, in effect, replacing the alkali metal to produce the 9,10-dihydroanthracene metal derivatives of the present invention.

Generally speaking, the organometallic compounds of the invention comprise tetravalent silicon, germanium, tin and lead derivatives of 9,10-dihydroanthracene wherein the metal atom is bonded to at least one of the 9,10-anthracene carbon atoms. Valences of the metal not satisfied by bonding to the anthracene carbons are bonded to halogen atoms, i.e. fluorine, chlorine, bromine, iodine, to a second 9,10-dihydroanthracene radical, or to a $C_1$ to $C_{22}$ monovalent hydrocarbon radical selected from the group consisting of alkyl, cycloalkyl, alkenyl, cycloakenyl, aryl, alkaryl and aralkyl radicals. Where only one of the 9,10-carbons of the anthracene moiety is bonded to the said metal atom, the other may be bonded to a second atom of the same metal, to hydrogen, or to a lower ($C_1$ to $C_8$) alkyl or lower ($C_6$ to $C_{10}$) aryl radical. Stated in another way, the compounds of the invention comprise derivatives of the tetravalent Group IV–B elements corresponding to the general formula $$AZD_y$$

wherein A is a 9,10-dihydro-9,10-anthrylene diradical, Z is a tetravalent atom of a Group IV–B element of atomic number 14 through 82, D is a member of the group consisting of another diradical A, monovalent $C_1$ to $C_{22}$ hydrocarbyl radicals and halogen, y is an integer from 0 to 3 except that when D is the diradical A, y is 1, and wherein in each instance the unsatisfied bond of the diradical A is joined to a member of the group consisting of the said atom Z, $D_yZ$—, hydrogen, $C_1$ to $C_8$ alkyl radicals, and $C_6$ to $C_{10}$ aryl radicals.

It may be mentioned that from purely valence considerations, it is conceivable for the metal atom to be bonded to as many as four anthrylene nuclei; however, steric considerations mitigate against such structures. In most instances, the metal atoms are bonded to only one or two anthrylene radicals.

In accordance with the invention, the novel Group IV–B 9,10-dihydro-9,10-anthrylene compounds are prepared by reacting an alkali metal adduct of anthracene with a Group IV–B metal halide. Alkali metal adducts of anthracene are formed when an alkali metal is contacted with anthracene under anhydrous conditions and in an oxygen-free atmosphere. Under these conditions, the 9,10-carbon atoms of anthracene and of certain substituted derivatives of anthracene are very reactive and readily metalated; thus, the alkali metal adducts of anthracene which are employed in the present invention may be represented by the formula

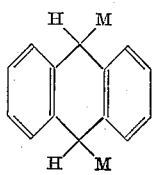

wherein M signifies an alkali metal. While adducts of any of the alkali metals may be used, adducts of those alkali metals of atomic number 3 through 19, i.e. lithium, sodium and potassium, are generally preferred because of the availability and lower cost of the metals therein. The 9,10-dihydro-9,10-disodioanthrylene, or more commonly, disodioanthracene, is the most preferred adduct for the purposes of this invention.

The tetravalent Group IV–B metal halides employed as reactants in the process of the invention include not only the tetrahalides, but also those metal halides having from 1 to 3 organic groups bonded to the metal atom. The Group IV–B reactants of the present invention may therefore be generically described as those having the general formula $$R_nZX_{4-n}$$

wherein R is a hydrocarbyl radical, Z is an element selected from the group consisting of silicon, germanium, tin and lead, X is a halogen atom and n is an integer from 0 to 3. Preferably, the hydrocarbyl radicals are $C_1$ to $C_{22}$ alkyl, cycloalkyl, alkenyl, cycloalkenyl, aryl, alkaryl and aralkyl radicals; however, organometallic halides containing higher molecular weight hydrocarbyl radicals may similarly be employed. As to the halogen of the Group IV–B metal reactant, either fluorides, chlorides, bromides or iodides are suitable; however, the chlorides are to be preferred since they are considerably less expensive.

In order to illustrate further the types of reactants and novel products which are formed in accordance with the process of the invention, the following equations are set forth. For convenience, the dialkali metal adduct of 9,10-dihydro-9,10-anthrylene diradical is represented by "$AM_2$." The radical R of the equations is as identified before, while R' is a lower ($C_1$ to $C_8$) alkyl or lower ($C_6$ to $C_{10}$) aryl radical. It will be noted that in all the products, bonding to the diradical is at the 9- and 10-carbon atoms. In the polymeric products, any unsatisfied diradical bonds are to metal atoms, while any unsatisfied valences of the metal atoms are to anthrylene diradicals. Of course, it is to be understood that terminal units of the polymers are chain terminating groups such as —A—H, —ZR₂X, —ZRX₂ and the like, Z being the Group IV–B element:

(1) 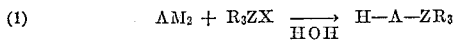

(2) 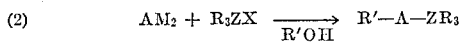

(3) 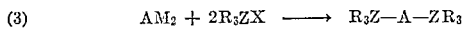

(4) 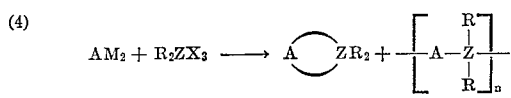

(5) 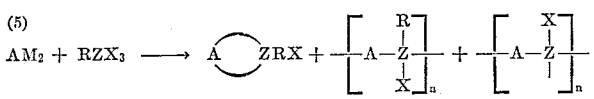

(6) 

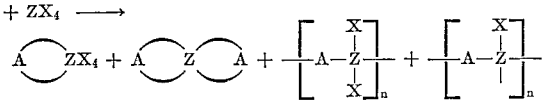

It will be appreciated that these equations are merely exemplary and not intended to depict all of the reaction products.

The process of the invention is carried out by contacting the alkali metal anthracene adduct and the Group IV–B metal halide under conditions which provide efficient mixing of the reactants. The reactants are susceptible to hydrolytic and/or oxidative attack; hence, it is preferred to carry out the reaction under anhydrous conditions and under an inert atmosphere, e.g. dry nitrogen. The reaction is exothermic and it is desirable to provide means for removing excess heat, especially during the initial stages of the reaction. In general, a reaction temperature in the range 0° to 150° C. is suitable, the particular temperature for any given reaction being largely dependent upon the reactivity of the particular reactants and the ease of formation of the desired product. Conveniently, the temperature of the reaction is the reflux temperature of the reaction mixture, provided, of course, such temperature does not exceed the decomposition temperature of the reactants and/or products. An inert solvent, i.e. one which is not consumed during the course of the reaction, is preferably employed to aid in the control of reaction temperature. Suitable solvents include the saturated aliphatic and aromatic hydrocarbons, dialkyl ethers, cyclic ethers such as tetrahydrofuran and tetrahydropyran and polyalkylene glycol diethers. The cyclic ethers and polyalkylene glycol diethers are especially preferred solvents for the process of this invention.

Generally, a molar ratio of the Group IV–B metal halide to alkali metal adduct of between 0.5–2/1 is used in the process; however, lesser or greater molar ratios may be employed, if so desired. Preferably, the quantity of each reactant is in accordance with the stoichiometry of the particular reaction desired. Except where the tetrahalides are employed, the order of addition of the reactants is not important. When tetrahalide is added to an excess of the alkali metal adduct, the spiro-metal anthrylene derivative, i.e.

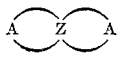

is preferentially formed. Hence, if products containing unreacted halogen, i.e.

are desired, it is better to add the alkali metal adduct to the metal tetrahalide. With the organometallic halides, it is preferred as a matter of convenience to add the Group IV–B metal reactant to the alkali metal adduct, since this procedure eliminates the necessity of transferring the alkali metal adduct from the reaction vessel in which it is prepared.

Variations in pressure do not significantly affect the course or rate of reaction; hence, the process of this invention is generally carried out at substantially atmospheric pressures although this is not essential.

The compounds of this invention which contain residual halogen atoms bonded to the Group IV–B metal atom are especially useful as intermediates in the preparation of a variety of other derivatives. The most direct manner of preparing the residual halogen-containing compounds would be to react a Group IV–B tetrahalide with an alkali metal anthracene adduct; however, in the case of tin tetrahalides, reduction to the tin dihalides occurs to some extent upon contact with the alkali metal adduct. A means of overcoming this difficulty is illustrated by the following reaction sequence:

(7) 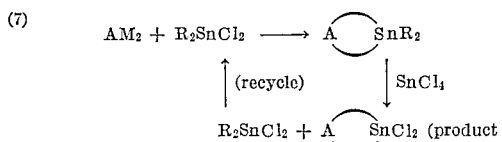

Separation of the desired product can be accomplished by either solution or distillation techniques. To illustrate,

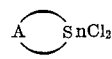

is insoluble in toluene or like solvents while the diorganotin dihalides and

compounds are soluble; hence, the desired product can be separated by filtration. Where distillation is employed, the dialkyltin dihalide can be separated for recycle at reduced pressure, e.g. below about 10 mm. An especially preferred diorganotin dihalide for this reaction sequence is dibutyltin dichloride; however, any of the other dialkyltin dichlorides having alkyl groups of from about 1 to 6 carbon atoms can similarly be used.

The following examples will further serve to illustrate compounds of the invention and their manner of preparation.

*Example 1.—9,10-bis(tributylstannyl)-9,10-dihydro-anthracene*

To 0.5 g. atom (11.5 g.) of metallic sodium cut into small cubes was added a suspension of 0.25 mole (44.5 g.) of anthracene in 300 ml. of dry tetrahydrofuran (THF). The reaction was carried out in a flask equipped with stirrer, condenser, dropping funnel, and heating mantle, and was protected by a static nitrogen atmosphere throughout. The addition was carried out as rapidly as the dropping funnel permitted. The internal temperature was about 40° to 45° C. after completion of addition. Heat was then applied and the mixture was heated and stirred at a slow reflux for 4 hours longer, and then allowed to cool.

To the 0.25 mole of disodioanthracene prepared in this way was then added 0.5 mols (162.6 g.) of tributyltin chloride in 250 ml. THF over a period of 4½ hours.

Stirring was continued for 1 hour longer. Then 20 ml. of methanol was added to destroy unreacted sodium, and finally, 100 ml. of water. The organic layer was separated from the aqueous layer and filtered to remove precipitated solids. The precipitate was acetone washed and the wash added to the organic layer, which was then evaporated to remove solvent. A light yellow oil, weighing 134 g. and fluorescing bright light blue in U.V. light, was obtained. A sample of the oil reduced the silver ion of silver nitrate in nitric acid, but did not precipitate silver chloride. Boiling 2 ml. of the oil with 10 ml. of concentrated hydrochloric acid and 25 ml. $H_2O$ yielded tributyltin chloride and a sublimate, fluorescing purple in ultraviolet light of 3660 A., identified as dihydroanthracene. The product of the reaction was identified as 9,10-bis(tributylstannyl)-9,10-dihydroanthracene.

*Example 2*

Substitution of other trihydrocarbyltin chlorides for the tributyltin chloride of Example 1 yields the following products.

Trihydrocarbyltin chloride:     Product
- Triphenyl __ $\phi_3$Sn—A—Sn—$\phi_3$.
- Tribenzyl __ $(\phi CH_2)_3$Sn—A—Sn—$(CH_2\phi)_3$.
- Trivinyl ___ $(CH_2{=}CH)_3$Sn—A—Sn$(CH{=}CH_2)_3$.
- Tridecyl ___ $(C_{12}H_{25})_3$Sn—A—Sn$(C_{12}H_{25})_3$.
- Tricyclohexyl ___ $(C_6H_{11})_3$Sn—A—Sn$(C_6H_{11})_3$.

*Example 3.—Dibutyl-(9,10-dihydro-9,10-anthrylene)tin*

To 0.25 mole of 9,10-disodioanthracene, prepared by adding 0.25 mole of anthracene to 0.5 g. atom of sodium in 400 ml. of tetrahydrofuran, was added 0.25 mole of dibutyltin dichloride in 150 ml. tetrahydrofuran over a period of 5.5 hours. The mixture was heated to reflux, about 69° C., for one hour and then allowed to cool to ambient temperature. To destroy excess sodium, 25 ml. of isopropanol was added and then 150 ml. of water. The reaction mixture separated into an aqueous layer, a white powder, and a yellow solid. The white powder and the yellow solid were each recrystallized from benzene. The former was found to be polymeric, having a melting point in excess of 300° C. and dissolving in $CCl_4$ with an appreciable viscosity increase. The latter yielded yellow crystals which melted and then polymerized at 225° to 235° C. to produce the polymer. The yellow crystals were identified as dibutyl-(9,10-dihydro-9,10-anthrylene)tin by molecular weight determination and tin analysis. The polymeric product on long boiling with concentrated HCl was converted to dibutyltin dichloride and a sublimate identified as dihydroanthracene based on U.V. fluoroescence and melting point. The polymer is therefore composed of ⁅A—Sn(Bu)$_2$⁆ units.

*Example 4.—Dimethyl-9,10-dihydro-9,10-anthrylene tin*

Dimethyltin dichloride (0.5 m., 109.9 g.) was allowed to react with disodioanthracene (0.5 m.) by the procedure of Example 3. Work-up yielded a small amount of polymer, M. P. above 300° C., and a larger amount of a crystalline product, M.P. 218° to 221° C., which tended to sublime. The crystalline product was identified as dimethyl-9,10-dihydro-9,10-anthrylene tin and the polymer as composed of ⁅A—Sn(CH$_3$)$_2$⁆ units.

*Example 5.—Diphenyl-9,10-dihydro-9,10-anthrylene tin*

Diphenyltin dichloride (0.25 m.) and disodioanthracene (0.25 m.) by the procedure of Example 3 yielded a product insoluble in hot benzene and having a melting point above 300° C. A second product, melting at 205° to 210° C., was soluble in benzene. These products were identified, respectively, as a polymer composed of ⁅A—Sn($\phi$)$_2$⁆ units and diphenyl-9,10-dihydro-9,10-anthrylene tin.

*Example 6*

Substitution of other dihydrocarbyltin dichlorides for the dibutyltin dichloride in Example 3 yields the following monomeric and polymeric products:

| Dihydrocarbyltin Dichloride | Monomer | Polymer |
|---|---|---|
| Dioctadecyl | A⟩Sn$(C_{18}H_{37})_2$ | ⁅—A—Sn$(C_{18}H_{37})_2$—⁆ |
| Dibenzyl | A⟩Sn$(C_6H_5CH_2)_2$ | ⁅—A—Sn$(C_6H_5CH_2)_2$—⁆ |
| Divinyl | A⟩Sn$(CH{=}CH_2)_2$ | ⁅—A—Sn$(CH{=}CH_2)_2$—⁆ |

*Example 7.—9,10-dihydro-9,10-anthrylene tin dichloride*

Disodioanthracene (0.5 mole) in 500 ml. of tetrahydrofuran was added dropwise to 0.5 m. (130 g.) of tin tetrachloride in 500 ml. of n-heptane. An extremely exothermic effect due to solvation of tin tetrachloride by THF was initially observed, but this subsided when about 75 ml. of the solution had been added. After the remainder of the solution was introduced, heat was applied, and the mixture refluxed for 2 hours. After cooling and standing overnight, the mixture was filtered to remove precipitated solids, the precipitate washed with toluene, and the washings added to the solution. The solution was exaporated to dryness and the product solids recrystallized from a mixture of cyclohexane and acetone. A minor amount of product softening between 265° and 295° C. and subliming at 310° C. was obtained. The major product, however, had a melting point in excess of 310° C., although softening between 245° and 250° C. Analysis showed it to contain 20.15% Cl and 32.6% Sn; theory for 9,10-dihydro-9,10-anthrylene tin dichloride,

is 19.3% Cl and 32.3% Sn.

*Example 8.—9,10-dihydro-9,10-anthrylene tin oxide*

The acetone wash solutions from the solid products of Example 7 were treated with excess ammonium hydroxide to yield a white precipitate weighing 14.2 grams and containing 36.0% Sn compared to theory of 37.9% for 9,10-dihydro-9,10-anthrylene tin oxide. The precipitate was soluble in excess sodium hydroxide or hydrochloric acid, a phenomenon similar to that experienced with well known organotin oxides. In base solution, it fluoresced yellow white, in acid deep blue to U.V. light of 3660 A. wave length.

*Example 9.—Bis(9,10-dihydro-9,10-anthrylene)tin*

When 0.125 m. (15 ml.) of tin tetrachloride in 50 ml. of heptane was added to 0.25 m. of disodioanthracene in 400 ml. of THF, a vigorous reaction ensued. The products were filtered to remove precipitated solids, and the solids washed with acetone and benzene. Evaporation of the solvents yielded a small quantity of yellow leaflets, bis(9,10-dihydro-9,10-anthrylene)tin melting at 227° to 228° C.

*Example 10.—Butyl-9,10-dihydro-9,10-anthrylene tin chloride*

Butyltin trichloride used in the process of Example 7 in place of tin tetrachloride yields as the major product butyl-9,10-dihydro-9,10-anthrylene tin chloride, which is hydrolyzed by ammonium hydroxide to the corresponding hydroxide.

*Example 11*

Silicon, germanium and lead derivatives of 9,10-dihydroanthracene are made by using the corresponding halides of these metals in place of the tin halides of the previous examples. The following table illustrates typical procedures, halides and products:

| Procedure | Metal halide | Products |
|---|---|---|
| Example 1 | $(CH_3)_3SiCl$ | $CH_3Si$—A—$SiCH_3$ |
| Example 3 | $(CH_3)_2SiCl_2$ | A⌒$Si(CH_3)_2$ and [—A—$Si(CH_3)_2$—] |
| | | A soft resinoid: M.W., 331; percent Si, 9.74. |
| Example 7 | $SiCl_4$ | A⌒$SiCl_2$ and [—A—$SiCl_2$—] |
| | | Difficultly separable from THF, necessary to ppt. using pentane on concentrated solution. A portion was recrystallized from benzene. |
| Example 3 | $(CH_3)_2GeBr_2$ | A⌒$Ge(CH_3)_2$ and [—A—$Ge(CH_3)_2$—] |
| Example 3 | $(CH_3)_2PbBr_2$ | A⌒$Pb(CH_3)_2$ and [—A—$Pb(CH_3)_2$—] |
| Example 7 | $PbCl_2$ → | A⌒Pb⌒A and [A⌒Pb⟨A—] |
| Example 3 | $(C_6H_5)_2PbBr_2$ | A⌒$Pb(C_6H_5)_2$ and [—A—$Pb(C_6H_5)_2$—] |

Generally speaking, the novel organometallic compounds of the present invention are useful in the same manner as the known organometallic derivatives of silicon, germanium, tin and lead which have like numbers of hydrocarbon substituents and halogen bonded to the metal atom. For example, those compounds in which the tin atom is bonded only to 9,10-dihydroanthrylene or other hydrocarbyl radicals, e.g. compounds such as $R_3Sn$—A—$SnR_3$,

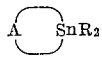

and the similarly substituted polymers, when intimately incorporated in amounts varying from 0.01 to 20 wt. percent, are useful as stabilizers for materials the decomposition of which is catalyzed by free halogen acids, e.g. halogenated transformer oils, halogen-containing polymers and the like. In amounts varying from about 0.1 to 30 g./gal., they are also useful as additives to hydrocarbon fuels wherein they function as aids in controlling combustion chamber deposits and in improving storage stability.

As illustrated by the following data, the dialkyl-(9,10-dihydro-9,10-anthrylene) tin compounds, when added in amounts varying from about 0.1 to 5.0, improve the oxidation stability of phenate-containing hydrocarbon base stocks which are used, for example, as crankcase lubricants in diesel engines:

Lubricant stability @ 340° F.[a]

| Phenate in base stock,[b] wt. percent | Tin compound,[c] wt. percent | Oxidized oil | | | |
|---|---|---|---|---|---|
| | | Viscosity increase, SSU | | Initial pH | Total base No. |
| | | After 19 hrs. | After 23 hrs. | | |
| 5.3 | None | 456 | 572 | 4.1 | Nil |
| 5.3 | 0.5 | 197 | 256 | 5.0 | 0.3 |

[a] E.R.E. stability test in which the lubricant is heated in the presence of a Cu-Pb bearing and a silver strip, and the viscosity increase in Saybolt Seconds Universal is measured after 19 and 23 hours. The lubricant's corrosiveness to Cu-Pb and silver-steel is also determined.
[b] The base stock was a mildly hydrofined and phenol extracted Tia Juana naphthenic fraction having a viscosity of 1058 SSU at 100° F. and 80 SSU at 210° F. and containing the specified amount of calcium nonyl phenol sulfide.
[c] Dibutyl-(9,10-dihydro-9,10-anthrylene)tin.

In addition to being useful per se for the same purposes to which the known hydrocarbyltin halides have been put, the 9,10-dihydroanthrylene tin derivatives wherein one or more halogen atoms are bonded to tin also provide intermediates for the preparation of numerous other useful organotin compounds. For example, the 9,10-dihydroanthrylene tin halides react readily with aqueous caustic to form the corresponding hydroxides and/or oxides. The oxides and hydroxides, as well as the halides, undergo a variety of reactions with reagents containing replaceable hydrogen, e.g. alcohols, amines, mercaptans, carboxylic acids, thiol acids, glycols, thioglycols, dithioglycols, mercaptoacids, mercaptoacid esters, mercaptoacid amides, phenols, carbamates, dithiocarbamates, isodithiocarbamates, xanthates, mercaptoalkyl borates, mercaptoalkyl sulfonates, mercaptoalkyl phosphites, dialkylmercapto phosphites, mercaptoalkyl phosphates, and the like. Typical of such reactions are the following:

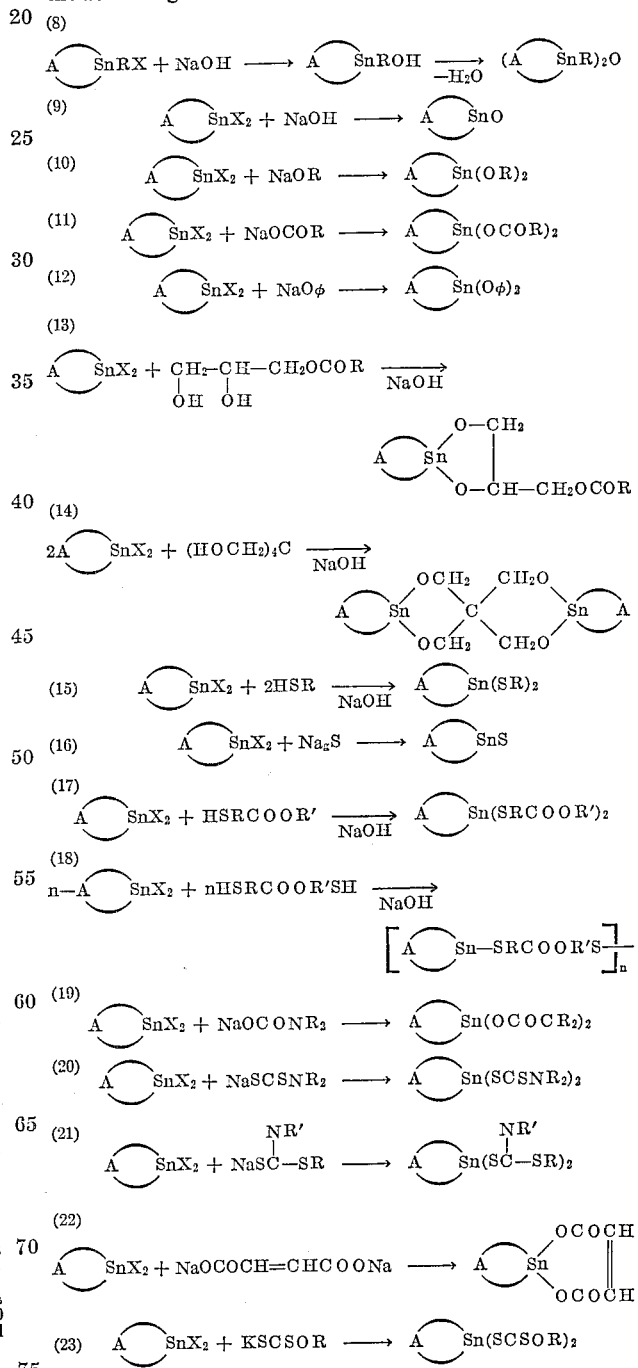

Many of the above reactions, as well as others, can be carried out also by substituting the corresponding tin oxides for the tin dihalides, and conducting the reaction under dehydrating conditions. For example,

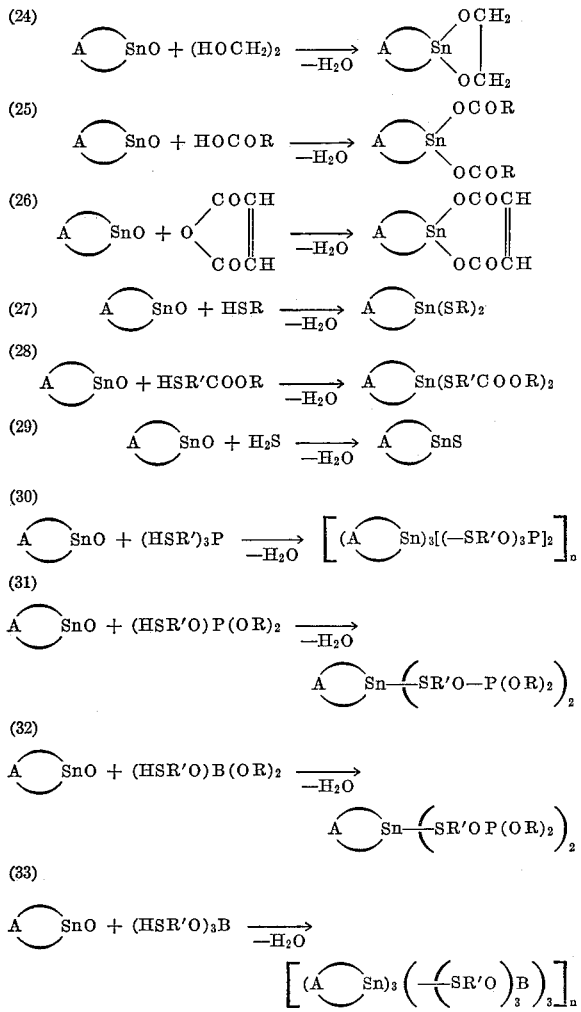

The oxides also undergo condensation reactions with ketones, aldehydes and esters:

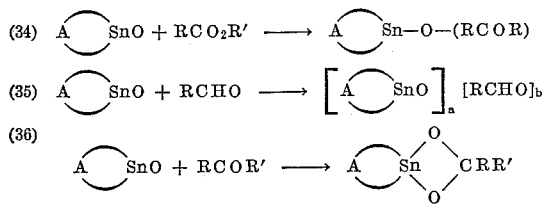

The monohalides,

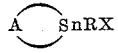

as well as the corresponding hydroxides, of course, undergo similar reactions to those shown above, the halogen or hydroxide being replaced by a single substituting group. In summation, it may be said that the 9,10-dihydroanthrylene tin halides of this invention, as well as the corresponding oxides and hydroxides, undergo all the general reactions of organotin halides, oxides and hydroxides known in the art and more completely set forth in publications such as Chemical Reviews, vol. 60, pages 460–525 (1960), and The Encyclopedia of Chemical Technology, second supplement, pages 523–548, Interscience Publishers (1960), to which reference is hereby made.

The 9,10-dihydroanthrylene tin compounds of the invention containing one or two functional groups bonded to tin possess properties suiting them to a variety of uses. Those derivatives containing a single halogen or other functional group bonded to tin, e.g. the trihydrocarbyltin halides, hydroxides, oxides, esters and the like, possess biocidal, insecticidal, fungicidal and germicidal activity. Appropriate compositions containing derivatives of this type in amounts ranging from 1 to 2 p.p.m. to 90% are useful in combatting mildew and other fungal growth on cellulosic materials and in paper mill wash waters. Paints useful in combatting marine growths or mildew are also provided by incorporating therein tin derivatives of this type. The 9,10-dihydroanthrylene tin dihalides and the difunctional compounds derivable therefrom, i.e. the dihydrocarbyl tin derivatives, possess utility as heat and light stabilizers for halogen-containing materials such as polyvinyl halide resins, polyvinylidene halide resins, halogenated natural and synthetic rubbers and the like when incorporated therein in amounts varying from 0.01 to 10 parts by weight. Anthelmintics and coccidiostats for poultry are also produced by incorporating the dihydrocarbyl tin compounds of this invention or amine adjuvants or derivatives thereof, e.g. piperazine, dimethyl piperazine and the like, in poultry feeds. In polymer compositions where ultraviolet light stabilization is desirable, the 9,10-dihydroanthrylene tin compounds of the invention find utility since the anthrylene moiety absorbs radiation in this region of the spectrum. Therefore, incorporating from 0.01 to 10 parts by weight of the 9,10-dihydroanthrylene tin compounds in compositions containing polystyrene, polyacrylate, polymethacrylate, polyacrylonitrile, polyethylene, polypropylene, cellulose acetate, and other similar polymeric materials inhibits their sensitivity to ultraviolet light.

In a like manner, the novel silicon, germanium and lead derivatives of the present invention find uses parallel to those already known for similarly substituted compounds of these metals. For example, the $$R_3—Si—A—Si—R_3$$

compounds and liquid silicon-anthracenyl polymers are useful per se as high temperature oils and hydraulic fluids or additives to hydrocarbon oils. Those silicon-anthracenyl compounds in which unreacted halogen is bonded to silicon can be converted by methods used with other hydrocarbyl silicon halides to heat-stable silicone oils and resins. The lead anthracenyl derivatives find use as additives in gasolines, lubricating oils and greases, while the germanium derivatives are suitable for antiknock and antioxidant additives for gasolines.

While the invention has been described with reference to specific examples and other illustrative embodiments, many modifications may be made without departing from the essential characteristics of the invention. For example, for purposes of simplification, the invention has been described with reference to the unsubstituted 9,10-dihydroanthrylene diradical. It will be apparent to those skilled in the art, however, that the 1-, 2-, 3-, 4- and 5-, 6-, 7- and 8-carbons of the diradical may be substituted with groups that are unreactive both with the reactants and the products of the described process; that is to say, the 9,10-dihydroanthrylene diradical may be substituted in the 1-, 2-, 3-, 4-, 5-, 6-, 7-, or 8-position by one or more $C_1$ to $C_8$ alkyl radicals or similarly unreactive hydrocarbon radicals, alkoxy radicals and the like without substantially affecting the character of the diradical. Hence, the invention contemplates the use of such substituted diradicals in place of 9,10-dihydroanthrylene per se.

As employed herein, the term "Group IV–B" refers to that term as found in the Periodic Arrangement (or Table) of the Elements as illustrated in numerous chemical handbooks and textbooks e.g. Lange's Handbook of Chemistry (8th ed.), Handbook Pub., Inc., Sandusky, Ohio, pages 54 and 55 (1952).

What is claimed is:

1. 9,10-dihydroanthracene organometallic derivative having the general formula

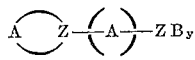

wherein

are 9,10-dihydro-9,10-anthrylene diradicals, Z is a tetravalent atom of a Group IV–B element of atomic number 14 through 82, B is a member of the group consisting of diradicals

monovalent $C_1$ to $C_{22}$ hydrocarbyl radicals and halogen, y is an integer from 0 to 3 except that when B is the diradical $-(A)-$, y is 1, and wherein in each instance the unsatisfied bond of the diradical $-(A)-$ is joined to a member of the group consisting of the said atom Z, $B_yZ-$ hydrogen, $C_1$ to $C_8$ alkyl radicals and $C_6$ to $C_{10}$ aryl radicals and in every instance all unsatisfied bonds of said atom Z are bonded to a member of the group consisting of monovalent $C_1$ to $C_{22}$ monovalent hydrocarbyl radicals and halogen.

2. 9,10-dihydro-9,10-anthrylene derivative according to claim 1 wherein said Group IV–B element is tin.

3. 9,10-dihydro-9,10-anthrylene derivative according to claim 1 wherein said Group IV–B element is silicon.

4. Tetravalent organometallic compounds of formula

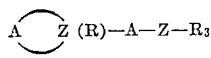

wherein R is a $C_1$ to $C_{22}$ monovalent hydrocarbyl radical, Z is a Group IV–B element of atomic number 14 through 82 and —A— is a 9,10-dihydro-9,10-anthrylene diradical.

5. A compound according to claim 4 wherein said Group IV–B element is tin.

6. A compound according to claim 4 wherein said Group IV–B element is silicon.

7. Tetravalent organometallic compounds of formula

wherein

is a 9,10-dihydro-9,10-anthrylene diradical, Z is a Group IV–B element of atomic number 14 through 82, and R is a $C_1$ to $C_{22}$ monovalent hydrocarbyl radical.

8. A compound according to claim 7 wherein said Group IV–B element is tin.

9. A compound according to claim 7 wherein said Group IV–B element is silicon.

10. Tetravalent organometallic compounds of formula

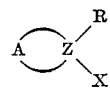

wherein

is a 9,10-dihydro-9,10-anthrylene diradical, Z is a Group IV–B element of atomic number 14 through 82, R is a $C_1$ to $C_{22}$ monovalent hydrocarbyl radical and X is halogen.

11. A compound according to claim 10 wherein said Group IV–B element is tin.

12. A compound according to claim 10 wherein said Group IV–B element is silicon.

13. Tetravalent organometallic compounds of formula

wherein

is a 9,10-dihydro-9,10-anthrylene diradical, Z is a Group IV–B element of atomic number 14 through 82, and X is a halogen.

14. A compound according to claim 13 wherein said Group IV–B element is tin.

15. A compound according to claim 13 wherein said Group IV–B element is silicon.

16. Tetravalent organometallic compound of formula

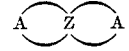

wherein

is a 9,10-dihydro-9,10-anthrylene diradical and Z is a Group IV–B element of atomic number 14 through 82.

17. A compound according to claim 16 wherein said Group IV–B element is tin.

18. A compound according to claim 16 wherein said Group IV–B element is silicon.

References Cited by the Examiner

UNITED STATES PATENTS

| | | | |
|---|---|---|---|
| 2,027,000 | 1/1936 | Scott | 260—665 |
| 2,910,495 | 10/1959 | George | 260—448.2 |
| 2,967,160 | 1/1961 | Brown | 260—448.2 |
| 3,117,149 | 1/1964 | Holdstock | 260—448.2 |
| 3,122,527 | 2/1964 | Webb et al. | 252—431 |

OTHER REFERENCES

Lange's Handbook of Chemistry (6th ed.), Handbook Pub., Inc., Sandusky, Ohio, pages 58 and 59 (1946).

TOBIAS E. LEVOW, *Primary Examiner.*

ABRAHAM H. WINKELSTEIN, *Examiner.*